Oct. 16, 1956     J. P. TRAVIS     2,766,860
PIVOTED WINDOW AND RETRACTIBLE SEALING MEANS THEREFOR
Filed Dec. 7, 1955     7 Sheets-Sheet 1
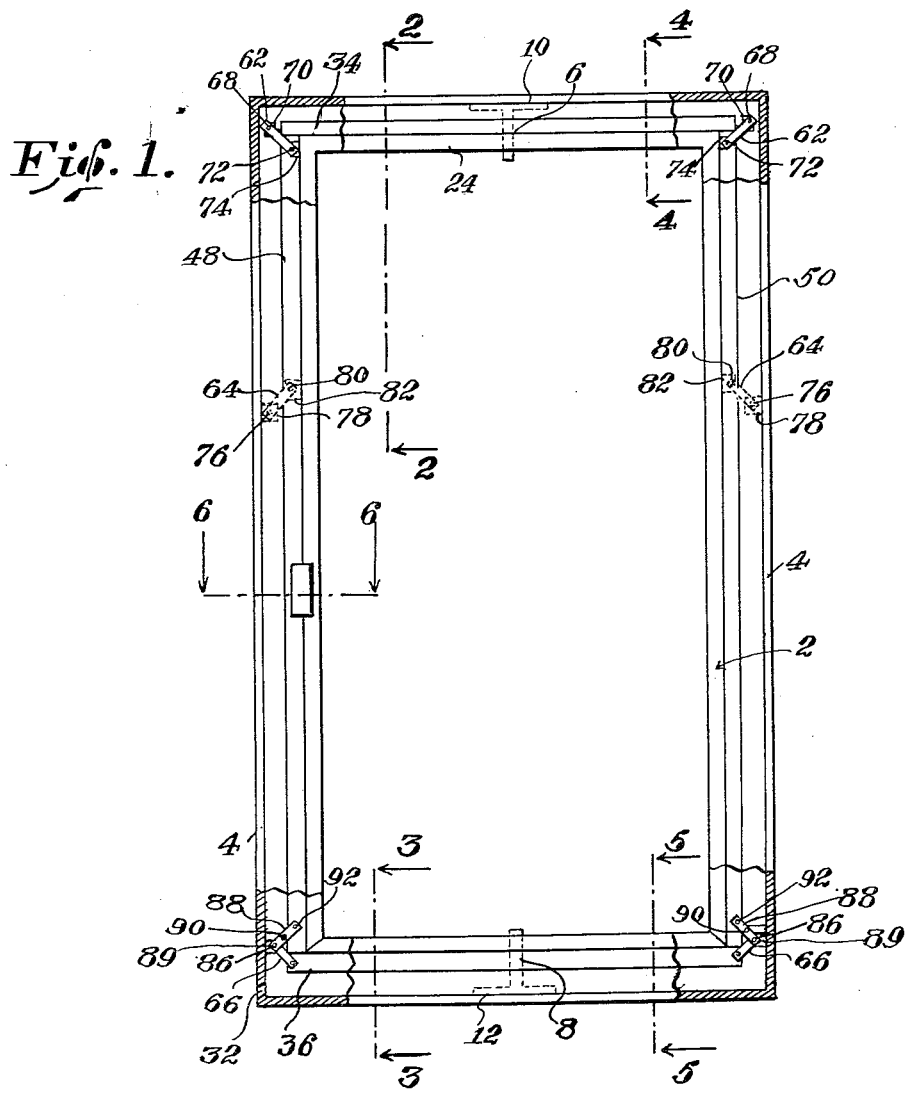
*INVENTOR.*
John P. Travis.

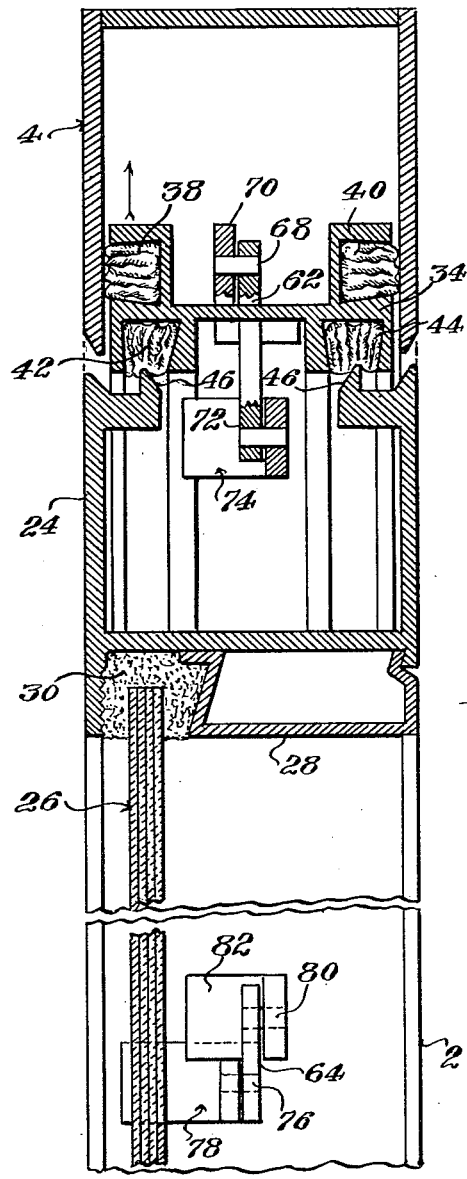
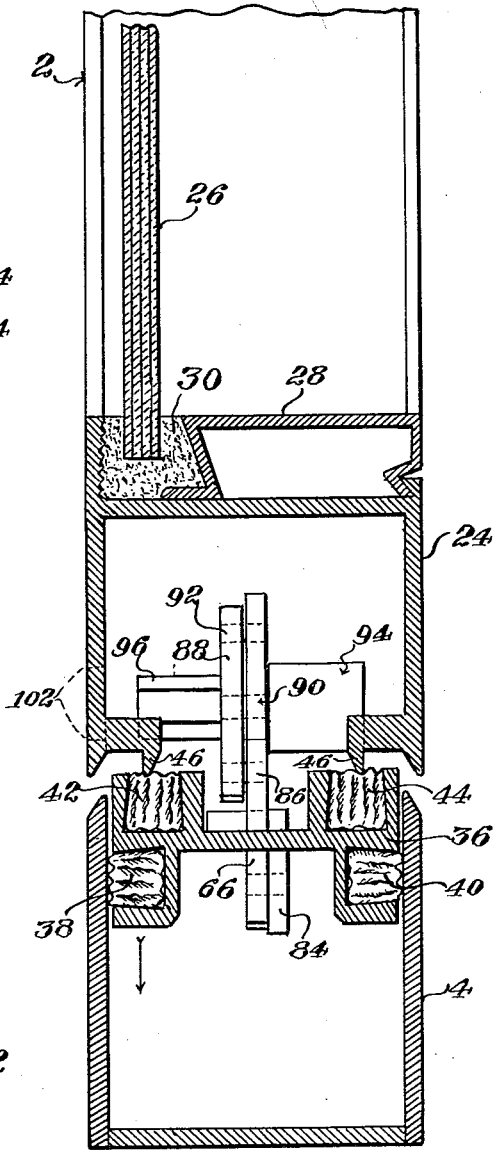

Oct. 16, 1956 J. P. TRAVIS 2,766,860
PIVOTED WINDOW AND RETRACTIBLE SEALING MEANS THEREFOR
Filed Dec. 7, 1955 7 Sheets-Sheet 3

INVENTOR.
John P. Travis.
BY
Mason & Mason
Attorneys.

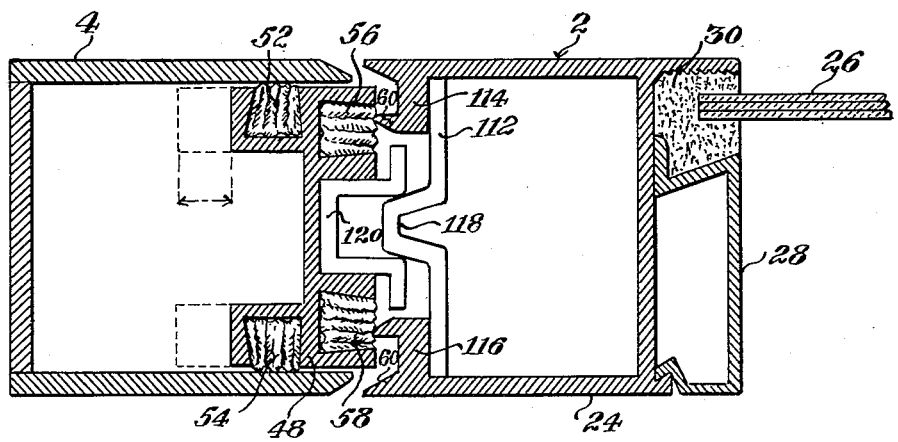
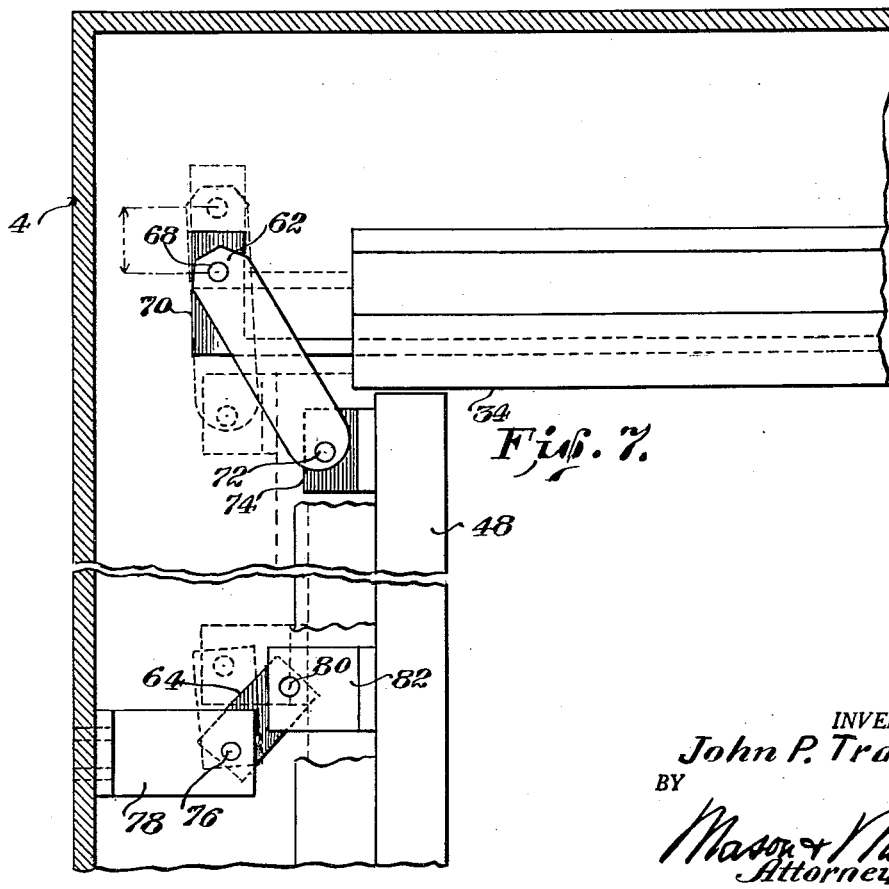

INVENTOR.
John P. Travis.

Oct. 16, 1956  J. P. TRAVIS  2,766,860
PIVOTED WINDOW AND RETRACTIBLE SEALING MEANS THEREFOR
Filed Dec. 7, 1955  7 Sheets-Sheet 6

INVENTOR.
John P. Travis.
BY
Mason + Mason
Attorneys.

Oct. 16, 1956   J. P. TRAVIS   2,766,860
PIVOTED WINDOW AND RETRACTIBLE SEALING MEANS THEREFOR
Filed Dec. 7, 1955   7 Sheets-Sheet 7

INVENTOR.
John P. Travis.
BY
Mason & Mason
Attorneys.

United States Patent Office 2,766,860
Patented Oct. 16, 1956

2,766,860

PIVOTED WINDOW AND RETRACTIBLE SEALING MEANS THEREFOR

John P. Travis, Dallas, Tex.

Application December 7, 1955, Serial No. 551,661

12 Claims. (Cl. 189—70)

This invention relates to a window sash pivoted on a central axis and having a retractible sealing means at each of its edges.

One of the principal objects of this invention is to provide a pivotally mounted window which, when in its closed position will be wind and water tight.

Another object of this invention is to provide a window with a retractible sealing means so mounted that all edges of the window sash are sealed simultaneously.

Still another object of this invention is to provide a window sash with a means to automatically center and lock the sash in its frame when the sealing means is moved to its sealing position.

A further object is to provide a retractible sealing means which may be used with any form of rectangular closure which does not move edgewise in its frame.

Another object of this invention is to provide a closure sealing means which may be moved to seal all of the edges of a closure simultaneously.

Still another object of this invention is to provide a retractible sealing means for a closure which is held in its retracted position by gravity.

A still further object of this invention is to provide a window sash or other closure with a sealing and locking means such that the window sash or closure cannot be left in an unlocked position when the sealing means is in its operative position.

Other objects of this invention will appear hereinafter throughout the specification.

Referring to the drawings:

Figure 1 is a side elevation of a window sash pivoted in a frame and having parts broken away to more clearly show the operating links for the retractible weather or sealing bars;

Figure 2 is a vertical is section taken on the line 2—2 of Figure 1 showing details of the operating links and the sealing means at the top of the window;

Figure 3 is a vertical section taken on the line 3—3 of Figure 1 showing details of the operating links and the sealing means at the bottom of the window;

Figure 6 is a horizontal section taken on the line 6—6 of Figure 1 showing the self-centering and self-locking means used between one edge of the sash and the frame;

Figure 7 is a detail view of the operating links at the upper left-hand edge of the window showing the retractible bars in their sealing positions and with the frame shown in vertical section;

Figure 4:
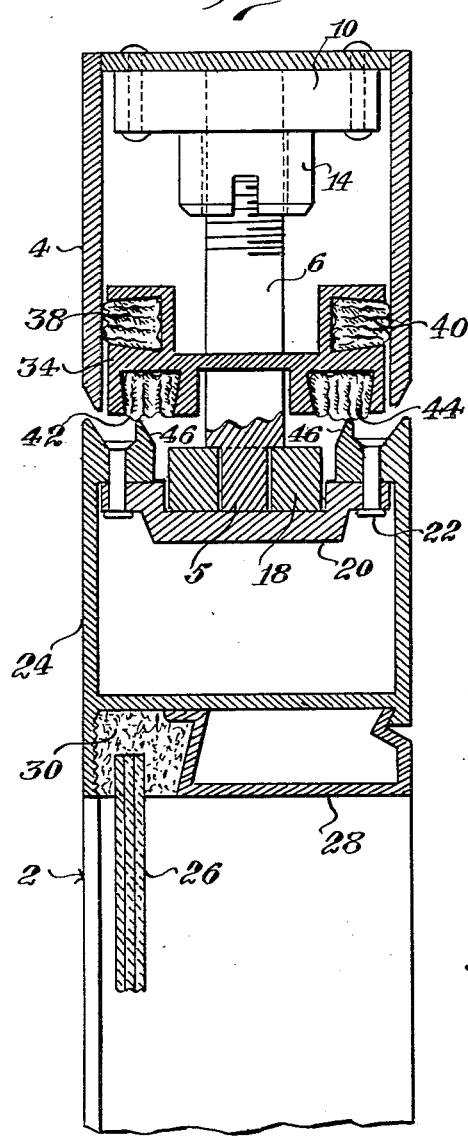
Figure 4 is a vertical section taken on the line 4—4 of Figure 1 showing the pivotal connection between the top of the window sash and the frame.

Referring now to the several figures of the drawings, 2 represents a window sash which is pivoted in a window frame 4 by means of upper and lower and adjustable pivot pins 6 and 8, respectively. The window frame 4 is angular in shape and of U-shape in cross section with the open side of the frame positioned toward the sash 2. Upper and lower pivot blocks 10 and 12, respectively, are secured to the bight portions of the upper and lower sections of the frame 4. These blocks are provided with holes to receive the reduced ends 5 of the pivot pins 6 and 8 on which are threaded the adjusting locking nuts 14 and 16, respectively. The other ends of these pins are rotatably mounted in bearing members 18 fitted in brackets 20 secured by rivets 22 or any other suitable means in the adjacent sash frame member 24. The pivot pins 6 and 8 are centrally located on the edges of the sash 2 so that when the weather bars are in their retracted positions, the sash may be swung through 360° thus allowing both sides to be cleaned or otherwise serviced from inside the window and without the use of scaffolding on the faces of buildings.

Figure 5:
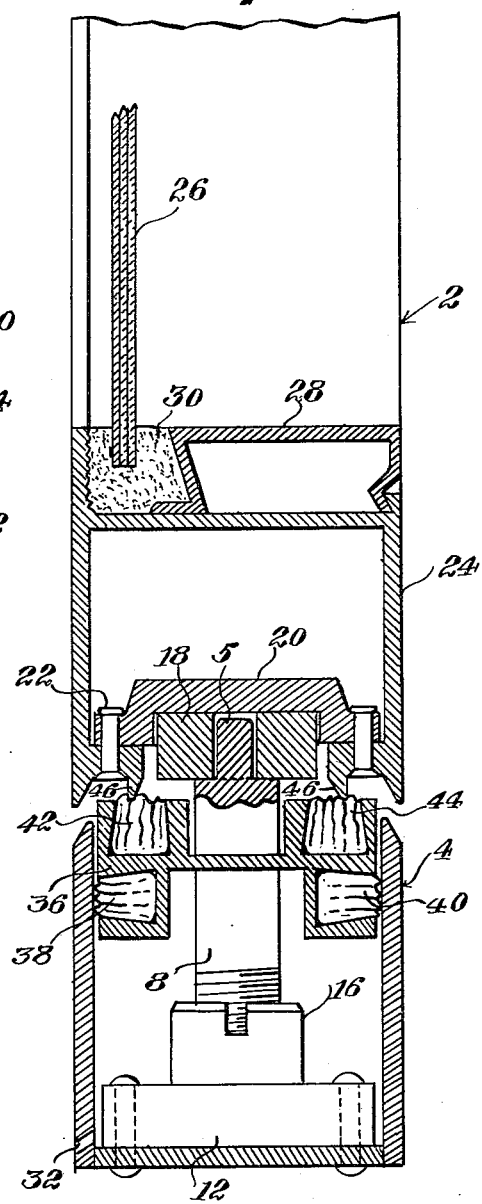
Figure 5 is a vertical section taken on the line 5—5 of Figure 1 showing the pivotal connection between the bottom of the window sash and the frame.

The window sash 2 comprises an edge frame 24 of U-shape in cross section with the open side facing outwardly and a pane of glass 26 secured within the frame 24 by a channel member 28 and sealed by putty or other suitable sealing compound 30. The lower side of the frame 4 may be provided with one or more drainage openings 32 whereby any water which may collect in the frame 4 may be drained away as shown in Figure 5.

Figure 13:
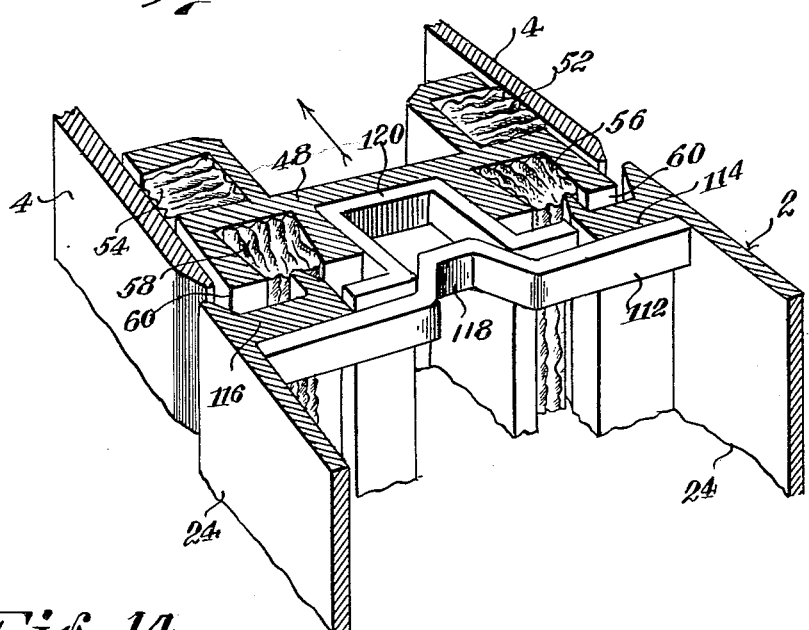
Figure 13 is a sectional view similar to Figure 6 but showing the centering and locking means enlarged and in perspective.
Figure 14:
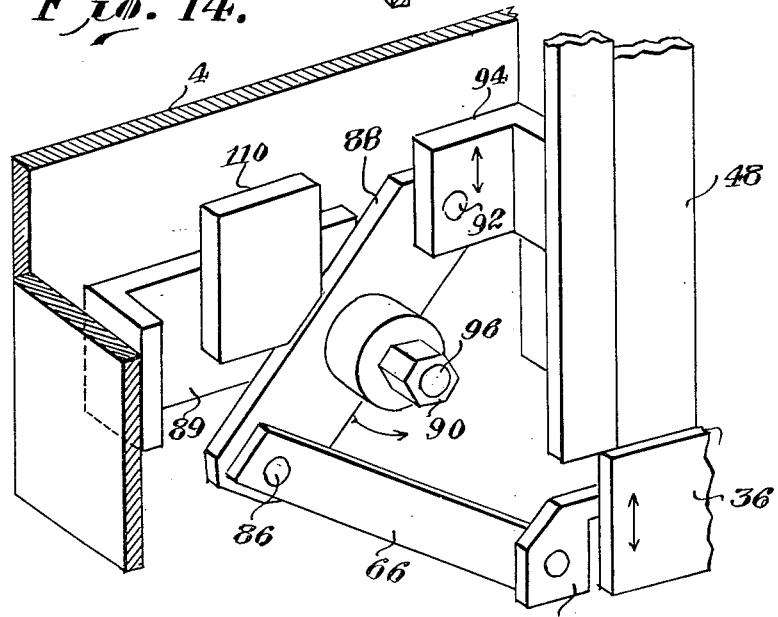
Figure 14 is a detail view in perspective showing the relationship of the operating links and the weather bars when in their operative positions.

The means for sealing the sash 2 within the frame 4 comprises upper and lower bars 34 and 36, respectively, and each of which spans the distance between the legs of the adjacent frame section and is slidable therebetween. Each bar is provided with four packing channels in which packing gaskets 38, 40, 42 and 44 are mounted. The gaskets 38 and 40 seal against the sides of the frame 4 while the gaskets 42 and 44 seal against ribs 46 on the adjacent edge of the sash 2. The side edges of the sash are sealed by bars 48 and 50 similar to the bars 34 and 36 except that they are longer. Each bar 48 and 50 extends from the top of the sash to the bottom and is overlapped at its ends by the upper and lower bars 34 and 36, respectively. As shown in Figures 6 and 13, the bar 48 has a cross section similar to that of the bars 34 and 36 and carries four gaskets 52, 54, 56 and 58, the first two of which seal against the frame 4 and the last two of which seal against the ribs 60 on the sash 2. The packing means on the bar 50 is the same as that on bar 48 except that their positions are reversed. Each of the bars 34 and 36 is so mounted that it may be moved in a vertical plane to and from the corresponding edges of the sash 2, while the bars 48 and 50 are so mounted that each has both a vertical and a lateral movement as it moves to and from its sealing position against the adjacent edges of the sash 2.

The bars 34, 36, 48 and 50 are so connected that they move to and from their sealing positions simultaneously. This action is brought about by the use of three sets of links 62, 64 and 66. The set 62 includes two links one at each side of the window frame and pivoted at 68 to the angle bracket 70 which is secured to the central portion of the bar 34 as clearly shown in Figure 2. The bracket 70 projects from the end of the bar 34 as clearly shown in Figures 1 and 7. The other end of each of the links 62 is pivoted at 72 to an angle bracket 74 secured to the adjacent end of the bar 48 or 50.

The second set of links includes two links 64 one at each side of the window frame and pivoted at 76 to an angle bracket 78 secured to the frame 4 and pivoted at its other end at 80 to an angle bracket 82.

Figure 12:
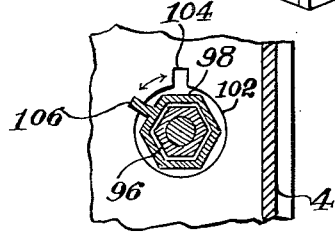
Figure 12 is a detail view in section showing the relationship of the key and the key-receiving shaft after the key has been turned to retract the sealing bars.

The third set of links includes a link 66 at each lower corner portion of the frame 4 and similar to the links 62. Each link 66 is pivoted at one end to a bracket 84, similar to the bracket 70 except that its position is reversed. The brackets 84 are secured to the ends of the lower retractible bar 36 which is mounted to move up and down in the sill portion of the frame 4. The other end of each of the links 66 is pivoted at 86 to an operating plate 88 which is carried on one end of the rotatable shaft 90 mounted on a bracket 89 in the frame 4. The other end of the plate 88 is pivoted at 92 to an angle bracket 94 secured to the bar 48 and similar to the brackets 74 and 82. The outer end of the shaft 90 is polygonal in cross section, as shown at 96, to receive a similarly shaped hollow key portion 98 on the key 100 which may be inserted through the key hole 102 in the frame 4 to engage the shaft. The key hole 102 has a pin slot 104 at one side which receives the pin 106 on the key. The key 100 is provided with a handle 108 on its outer end to operate the key when it has been applied to the shaft 96. As shown in Figure 12, the key pin 106 is within the frame 4, when in position to operate the shaft, so that when the key is turned the pin will be located behind the outer wall of the frame 4. Thus the key cannot be removed until the pin 106 has been brought into registry with the slot 104, with the result that the key cannot be removed until it has been brought back to its original position. In order to limit the movement of the plate 88 in a counterclockwise direction, the frame 4 is provided with a stop member 110. While the outer end 96 of the shaft 90 and the hollow key portion 98 have been shown as being hexagonal in cross section, it will be understood that any other cross sectional shape having some means to prevent relative rotation between the shaft end 96 and the portion 98 may be used, if desired.

A centering and locking means is shown in Figures 6 and 13 and comprises a bar 112 which is secured to the inner sides of the inturned flanges 114 and 116 on the outer side of the sash frame 24. The bar 112 is provided intermediate its ends with a substantially V-shaped projection 118 which is positioned to be engaged by a substantially U-shaped member 120 which is secured to the retractible bar 48 between the gaskets 56 and 58. While the centering and locking means has been shown as applied to one side of the window only, it will be understood that it could be applied to each side of the window, if desired.

Operation

Assuming that the weather bars 34, 36, 48 and 50 are in their sealing positions against the edges of the sash 2 and it is desired to retract the bars, a key 100 is applied to each of the shafts 90 at the lower corners of the frame 4 and the keys rotated in opposite directions, the one on the right side in a clockwise and the one on the left side in a counterclockwise direction. As a result of this rotation, the plates 88 are moved outwardly against the stop members 110. In this position, the pivots 92 will be located slightly outwardly of the shaft 90 with the result that the retractible bars will be held in their retracted positions by the action of gravity.

Figure 8:
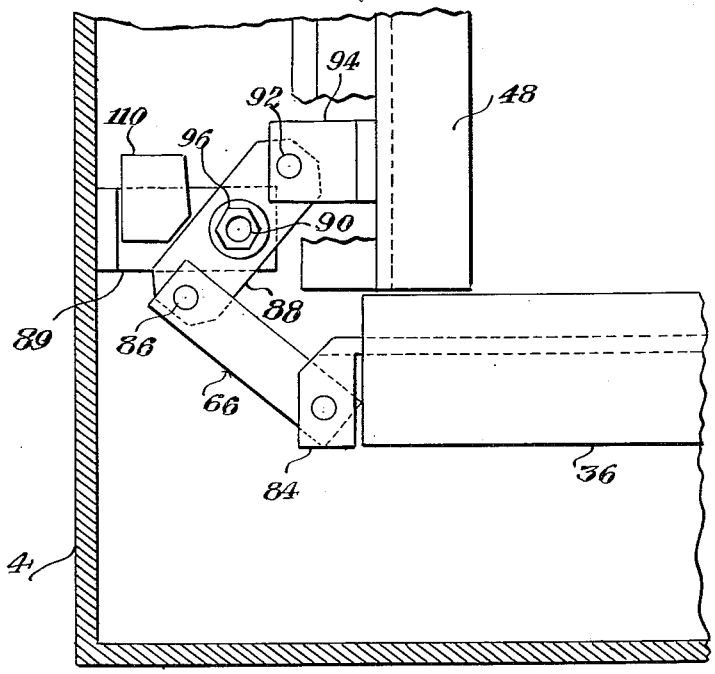
Figure 8 is a detail view in section of the operating links at the lower left hand edge of the window showing the retractible bars in their sealing positions.
Figure 9:
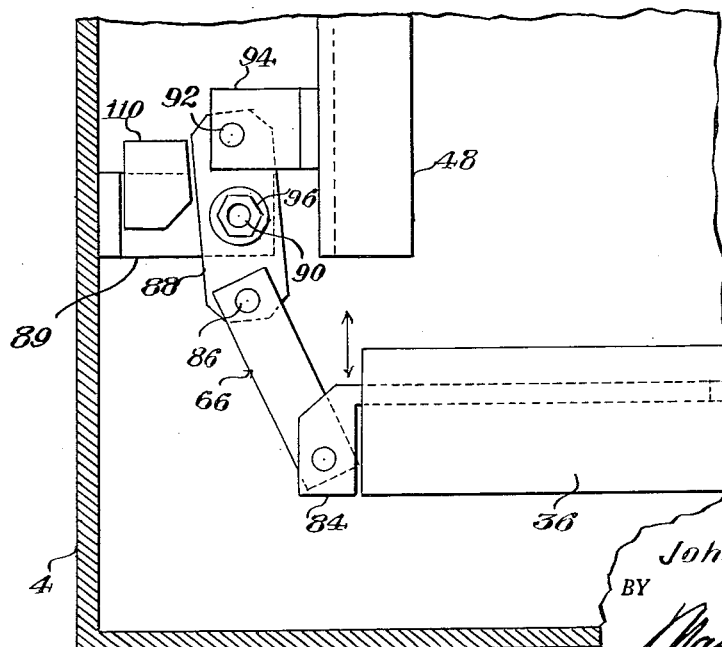
Figure 9 is a detail view similar to Figure 8 but showing the retractible bars in their retracted positions.
Figure 10:
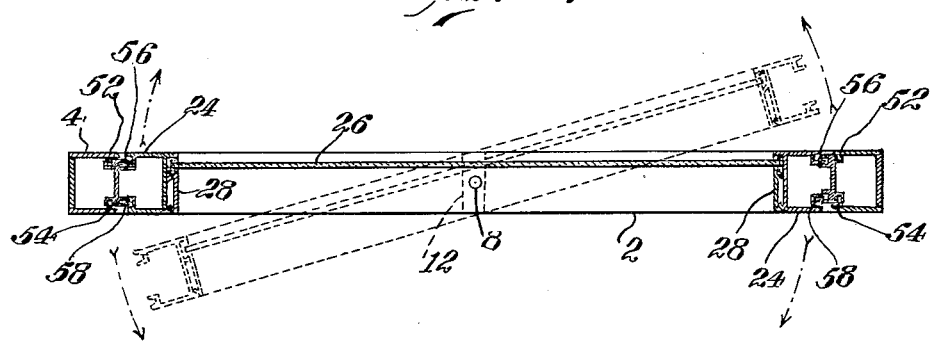
Figure 10 is a horizontal section through the window sash and its frame showing the sash in its closed position in full lines and in its open position in dotted lines but with details of the links and sealing gaskets omitted for the sake of clarity.
Figure 11:
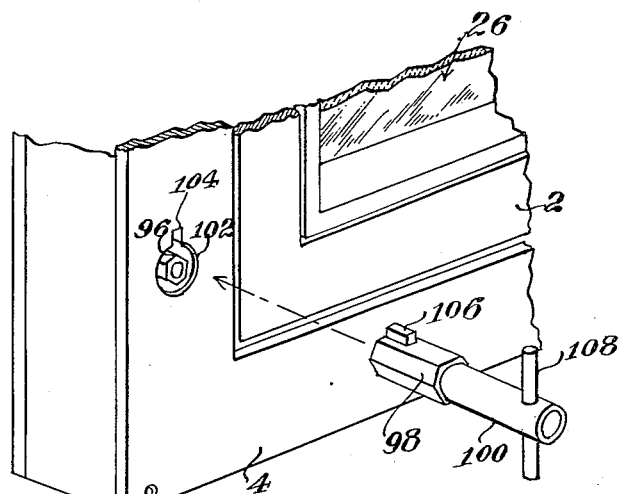
Figure 11 is a detail view in perspective of one lower corner of the window frame and sash, indicating the relationship of the key and key-receiving shaft used in operating the links and in turn the weather bars.

Referring now particularly to Figures 1, 7, 8 and 9, it will be seen that as the plate 88 moves to the left from the position of Figure 8, the bracket 94 will be lifted and moved to the left, carrying the bar 48 with it. When the left side of the plate engages the stop 110, the pivot 92 will be in the dotted line position slightly to the left of the shaft 90, where it will remain until again operated by the key 100. As the bar 48 is moved upwardly and outwardly away from the sash 2, the pivots 80 and 72 of the links 64 and 62, respectively, will also be moved upwardly and outwardly as indicated in dotted lines in Figure 7. As the pivots 72 move upwardly and outwardly, they will carry the links 62 with them and these, in turn, will move the bar 34 vertically upwardly to the dotted line position. As shown in Figures 8 and 9, when the plate 88 is turned as indicated above, the lower bar 36 will be moved by the links 66. Since the bar 50 has the same operating arrangement as the bar 48, it will be seen that, as the shafts 90 are turned in opposite directions, the four bars 34, 36, 38 and 50 will all be moved to their retracted positions simultaneously, thereby freeing the sash for substantially resistance-free rotation on its pivots 6 and 8. The centering locking means 118—120 will also become disengaged at the same time.

When it is desired to seal the window, the sash 2 is rotated into a position in alignment with the frame 4 and then the keys are operated in the opposite directions to bring all four weather bars into their operative positions against the edges of the sash 2. As the bars 48 and 50 move to their sash-engaging positions, the bars 120 move toward the bars 112 on the sash and finally engage the sides of the V-projection 118 to center the sash with respect to the frame 4 and lock it against movement until the retractible bars are again moved to their retracted positions. Since the key cannot be removed from the shaft until the key pin 106 registers with the slot 104, the window cannot be closed and left in an unlocked condition.

The pivots used to connect the sealing bars 34, 36, 48 and 50 to the brackets on the frame 4 are readily removable so that, when it is desired to replace the sealing bars 48 and 50, they may be moved outwardly through the open sides of the frame 4 after the sash has been moved to its open position. However, in order to remove the top and bottom bars 34 and 36, the sash must be completely removed from the frame 4, in view of the fact that the pivots 6 and 8 extend through these bars.

The window frame and the sash frame have both been shown as being of substantially U-shape in cross section but it will be understood that any other suitable form could be used. Further, the sash pivots have been shown as being centrally located on two opposite sides of the sash but it is apparent that the specific arrangement of the sealing bars disclosed could be used with any type of pivoted sash or other closure. Likewise, any other suitable form of sealing gaskets, and centering and locking means could be used.

While keys have been disclosed as the operating means for the links and weather bars, it will be understood that any suitable means could be used to perform this function.

While only one link 64 has been shown at each side of the window, it will be understood that as many of these links may be used as desired.

As shown in Figures 4 and 5, the pivot pins 6 and 8 are vertically adjustable by means of the nuts 14 and 16, respectively, which are positioned to bear against the adjacent pivot blocks. Specific details of the pivot pins and their mountings are not shown in Figure 1 for the sake of clarity.

The above description and drawings disclose one embodiment of the invention, and specific language has been employed in describing the figures. It will, nevertheless, be understood that no limitations of the scope of the invention are thereby contemplated, and that various alterations and modifications may be made as would occur to one skilled in the art to which the invention relates.

I claim:

1. A closure sealing means comprising a frame having a rectangular opening therein, a movable closure in said opening, a first pair of parallel oppositely disposed retractible sealing bars arranged in said opening with each bar disposed in proximity to a side of said opening, a second pair of parallel oppositely disposed retractible sealing bars arranged in said opening at right angles to said first pair with each bar in proximity to another side of said opening, a bracket projecting axially from each end of each of said first pair of bars and past the adjacent end of a bar of said second pair, a first link pivoted at one end to each bracket on one bar of said first pair and at its other end to the adjacent end of a bar of said second pair, a second link located between the ends of each bar of said second pair and pivoted at one end to said frame and at its other end to a bar of said second pair, a pair of rotatable operating shafts mounted in said frame adjacent one side thereof and in proximity to the brackets on the other bar of said first pair, an elongated plate rigidly secured to each of said shafts and extending laterally in opposite directions therefrom, one end of each plate being pivotally attached to the adjacent bar of said second pair, a third link pivoted at one end to the adjacent bracket and at its other end to the other end of said plate, said shafts each being rotatable in either direction, and said links and plates being so arranged that when said shafts are simultaneously rotated to move the first mentioned ends of said plates toward each other, the sealing bars will all be moved simultaneously into sealing engagement with the edges of said closure, and when rotated in the opposite directions said sealing bars will be moved simultaneously to retracted positions, thus freeing the closure for movement in said frame.

2. A closure sealing means as in claim 1, wherein said closure is pivotally mounted within said frame.

3. A closure sealing means as in claim 1, wherein a stop is mounted on said frame adjacent each shaft to limit movement of said plate in one direction.

4. A closure sealing means as in claim 1, wherein said closure is pivoted in said frame midway between two opposite sides so that it may be rotated three hundred and sixty degrees within its frame.

5. A closure sealing means as in claim 1, wherein said frame is of substantially U-shape in cross section and the sealing bars are slidably mounted therein and readily removable therefrom.

6. A closure sealing means as in claim 1, wherein said closure and one of said sealing bars have cooperating means to center and lock said closure as said one sealing bar is brought to its sealing position.

7. A closure sealing means as in claim 1, wherein said frame is vertically disposed and said closure is mounted on vertical pivots.

8. A closure sealing means as in claim 1, wherein said closure is a window sash.

9. A closure sealing means as in claim 1, wherein means is provided to releasably maintain said retractible sealing bars in retracted position against the action of gravity.

10. A closure sealing means as in claim 1, wherein each retractible sealing bar has two sets of sealing gaskets, one set to seal against the inner surface of said frame and the other set against an edge of said closure.

11. A closure sealing means as in claim 7, wherein two opposite sides of said closure are provided with means on said vertical pivots to adjust said closure with relation to the upper and lower sides of said frame.

12. A closure sealing means comprising a frame having a rectangular opening therein, a first pair of parallel oppositely disposed retractible sealing bars arranged in said opening with each bar disposed in proximity to a side of said opening, a second pair of parallel oppositely disposed retractible sealing bars arranged in said opening at right angles to said first pair with each bar in proximity to another side of said opening, a bracket projecting axially from each end of each of said first pair of bars and past the adjacent end of a bar of said second pair, a first link pivoted at one end to each bracket on one bar of said first pair and at its other end to the adjacent end of a bar of said second pair, a second link located between the ends of each bar of said second pair and pivoted at one end to said frame and at its other end to a bar of said second pair, a pair of rotatable operating shafts mounted in said frame adjacent one side thereof and in proximity to the brackets on the other bar of said first pair, an elongated plate rigidly secured to each of said shafts and extending laterally in opposite directions therefrom, one end of each plate being pivotally attached to the adjacent bar of said second pair, a third link pivoted at one end to the adjacent bracket and at its other end to the other end of said plate, said shafts each being rotatable in either direction, and said links and plates being so arranged that when said shafts are simultaneously rotated to move the first mentioned ends of said plates toward each other, the sealing bars will all be moved simultaneously inwardly of said opening, and when rotated in the opposite directions said sealing bars will be moved simultaneously to their retracted positions.

References Cited in the file of this patent

UNITED STATES PATENTS

| 835,251 | Parker | Nov. 6, 1906 |
| 2,268,114 | Foster et al. | Dec. 30, 1941 |